(12) United States Patent
Mahajan et al.

(10) Patent No.: US 11,823,217 B2
(45) Date of Patent: Nov. 21, 2023

(54) ADVANCED SEGMENTATION WITH SUPERIOR CONVERSION POTENTIAL

(71) Applicant: ADOBE INC., San Jose, CA (US)

(72) Inventors: Rushil Mahajan, Bengaluru (IN); Kumar Mrityunjay Singh, Bengaluru (IN)

(73) Assignee: Adobe Inc., San Jose, CA (US)

( * ) Notice: Subject to any disclaimer, the term of this patent is extended or adjusted under 35 U.S.C. 154(b) by 75 days.

(21) Appl. No.: 16/671,396

(22) Filed: Nov. 1, 2019

(65) Prior Publication Data

US 2021/0133782 A1 May 6, 2021

(51) Int. Cl.
*G06Q 30/00* (2023.01)
*G06Q 30/0204* (2023.01)
(Continued)

(52) U.S. Cl.
CPC ......... *G06Q 30/0204* (2013.01); *G06N 20/00* (2019.01); *G06Q 30/0201* (2013.01);
(Continued)

(58) Field of Classification Search
CPC .......... G06Q 30/0204; G06Q 30/0201; G06Q 30/0246; G06Q 30/0254; G06Q 30/0255;
(Continued)

(56) References Cited

U.S. PATENT DOCUMENTS

2003/0105731 A1* 6/2003 Lapointe ................ G16H 50/20
706/15
2009/0282218 A1* 11/2009 Raichelgauz ....... G06F 16/1748
712/36

(Continued)

FOREIGN PATENT DOCUMENTS

WO WO2001065747 * 3/2000 ......... H04N 7/17318

OTHER PUBLICATIONS

Belo et al., The Impact of Time-shift Television on TV Viewership Behavior, https://conference.nber.org/confer/2016/SI2016/PRIT/Belo_Ferreira_Godinho_de%20Matos_Reis.pdf, Heinz College, Carnegie Mellon University, 2016 (Year: 2016).*

(Continued)

*Primary Examiner* — Patricia H Munson
*Assistant Examiner* — Uche Byrd
(74) *Attorney, Agent, or Firm* — SHOOK, HARDY & BACON L.L.P.

(57) ABSTRACT

A segmentation system utilizes a supervised learning method and a clustering analysis to identify clusters, thereby segmenting a population into groups, where the clusters are associated with various conversion potentials that indicate the probability of an event. The segmentation system employs the supervised learning method to train a model on training data comprising historical conversion data and features associated with members of the group. A subset of features is selected from a ranked order that is determined using weights generated by the supervised learning. A clustering analysis is performed for a population with respect to the subset to generate clusters. A superior cluster is identified based on it having a conversion potential greater than a conversion potential of another cluster. In a marketing context, the system can be employed to identify a superior cluster of users that have a higher conversion potential in response to an advertisement campaign.

17 Claims, 6 Drawing Sheets

(51) Int. Cl.
*G06Q 30/0251* (2023.01)
*G06Q 30/0201* (2023.01)
*G06N 20/00* (2019.01)
*G06Q 30/0242* (2023.01)
*G06Q 30/0241* (2023.01)

(52) U.S. Cl.
CPC ..... *G06Q 30/0246* (2013.01); *G06Q 30/0254* (2013.01); *G06Q 30/0255* (2013.01); *G06Q 30/0269* (2013.01); *G06Q 30/0276* (2013.01)

(58) Field of Classification Search
CPC . G06Q 30/0269; G06Q 30/0276; G06N 20/00
See application file for complete search history.

(56) References Cited

U.S. PATENT DOCUMENTS

2010/0205541 A1* 8/2010 Rapaport .............. G06F 16/285
715/753
2016/0261544 A1* 9/2016 Conover ................ H04L 51/32

OTHER PUBLICATIONS

Finley, T., and Joachims, T., "Supervised k-Means Clustering", Department of Computer Science, Cornell University, pp. 1-9 (2008).

* cited by examiner

|  | Feature 1 | Feature 2 | Feature 3 | Feature 4 |
|---|---|---|---|---|
| User 1 | 1 | 0 | 1 | 0 |
| User 2 | 1 | 0 | 0 | 0 |
| User 3 | 0 | 1 | 1 | 1 |
| User 4 | 1 | 0 | 1 | 1 |

300, 302, 304, 306, 308

| Feature Ranking Weights |
|---|
| Feature 1: 0.21 |
| Feature 2: 0.31 |
| Feature 3: 0.12 |
| Feature 4: 0.37 |

310

|  | Feature 1 | Feature 2 | Feature 3 | Feature 4 |
|---|---|---|---|---|
| User 1 | 1*0.21 | 0 | 1*0.12 | 0 |
| User 2 | 1*0.21 | 0 | 0 | 0 |
| User 3 | 0 | 1*0.31 | 0 | 1*0.37 |
| User 4 | 1*0.21 | 0 | 1*0.12 | 1*0.37 |

ADVANCED SEGMENTATION WITH SUPERIOR CONVERSION POTENTIAL

BACKGROUND

Segmentation systems perform segmentation analysis on populations of individuals in order to divide, or segment, the individuals into small groups, where individual members of each group share some common feature. This is beneficial for many applications, and is commonly performed. For example, populations of individuals are segmented into groups to conduct studies, to take polls, and to accomplish certain tasks.

Population segmentation is particularly beneficial for targeting content to only portions of a population, such as those that are most likely to respond to the content by performing desired actions, such as purchasing an item. When a member of the population responds to content by performing a particular action, the action is said to be a "conversion". Thus, it is beneficial to target individuals with a higher conversion potential, and therefore, it is desirable to segment populations into groups that increase this conversion potential.

One conventional method used by segmentation systems to segment populations includes grouping the population based on common features. This method is an unsupervised method of grouping. Groups formed using this method generally have similar conversion potentials, and reorganizing the groups typically does not alter the conversion potential. This is because each member has many associated features, and though group members may share a common feature, they will almost certainly exhibit other uncommon, even conflicting, features. Thus, reorganizing groups using this method fails to change the conversion potential from group to group.

Another conventional method used by segmentation systems includes ranking members of a population based on their history of conversion in response to advertisements. Ranking the members based on information about their historic conversions allows an advertiser to group together the members that have higher individual conversion potential. However, while this method segments a population into a group based on an individual's conversion potential, the overall conversion potential for the group remains lower, since members of the group do not likely share common features that correlate to conversion. As such, the size of the group is limited to smaller numbers, since increasing the member number randomizes the features, thus leveling out the conversion potential to low values.

SUMMARY

At a high level, aspects described herein relate to advanced segmentation using a supervised learning method and a clustering analysis to identify superior clusters—those clusters having a higher conversion potential relative to other clusters. One method of generating a superior cluster begins by training a model using a supervised learning method. To do so, the model is trained using data that includes user features (for example, age, location, language, email-access frequency, etc.) and historical conversion data (for example, number of prior conversions and frequency of prior conversions). Training the model identifies a feature ranking weight associated with each of the user features, which indicates the strength of the correlation between the user feature and user conversion, and thus providing a ranked order for the user features. Based on the ranking of the user features, a subset of the user features is then selected by including a number of highest ranked user features in the subset.

When a population of users is received, the users are then segmented into clusters, where a superior cluster has a higher conversion potential. To identify clusters, a clustering analysis, such as a hierarchical clustering analysis, can be performed for the population with respect to the subset of user features. In this aspect, the clustering analysis is performed for the population, but only with respect to the user features included in the subset that was selected based on the supervised learning. In this way, clusters that result from the clustering analysis have varying conversion potentials. Some clusters have relatively high conversion potentials when compared to conversion potentials of other identified clusters. A superior cluster is identified when a cluster has a higher conversion potential than other clusters also identified during the analysis.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 3 is an example of matrices suitable for use with the segmentation system of FIG. 2, in accordance with an aspect described herein;

DETAILED DESCRIPTION

Definitions

Figure 1:
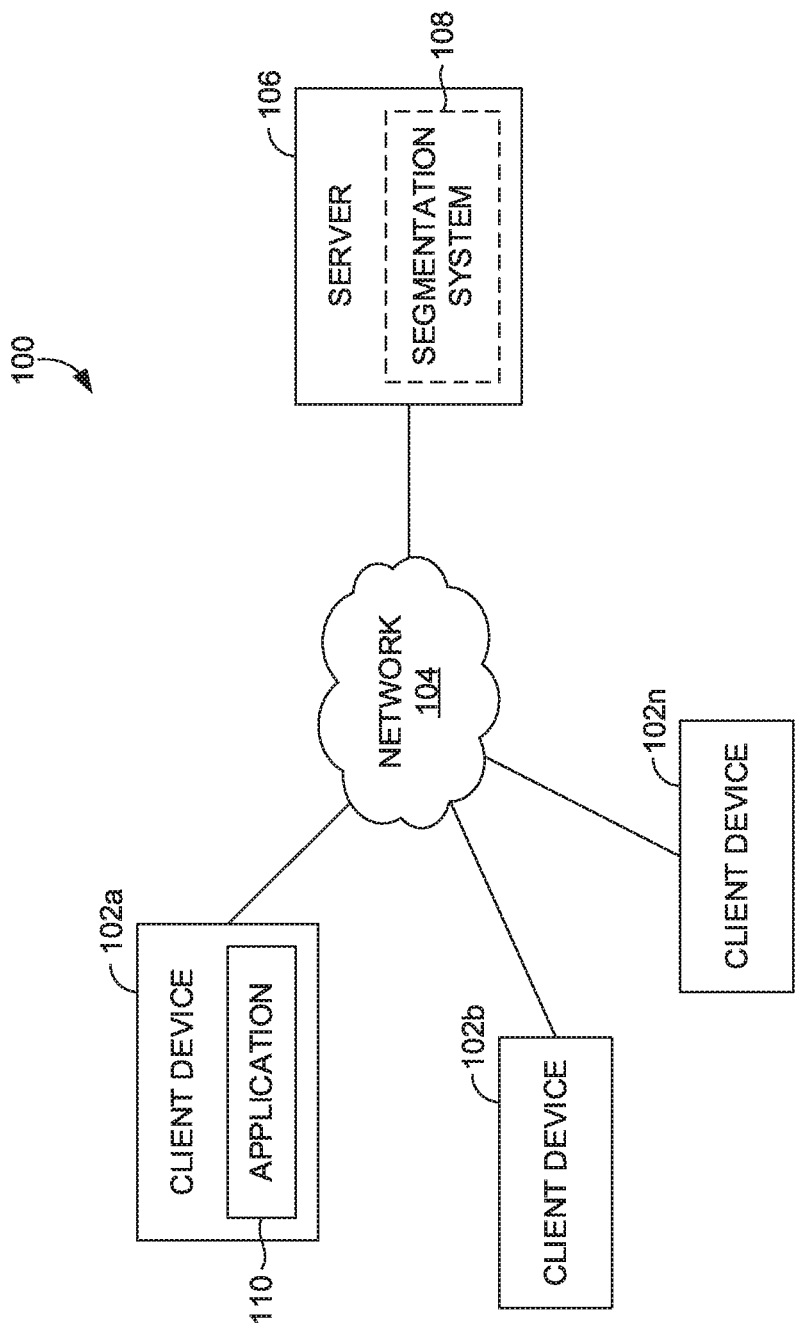
FIG. 1 is an example operating environment suitable for employing a segmentation system, in accordance with an aspect described herein.

Various terms are used throughout this description. Definitions of some terms are included below to provide a clearer understanding of the ideas disclosed herein.

A "user feature" generally refers to any piece of information that can be attributable to or exhibited by a user. User features can include "raw features," which are features that may be determined from an action or characteristic, or "derived features," which are features that may be derived from two or more raw features, or from a raw feature and another associated item of information.

"Conversion data" generally includes information related to a user's conversion, broadly meaning a user's response based on information received by the user. For example, a user receives an advertisement (the received information) and purchases (the user's response) the item being advertised.

A "feature ranking weight" generally refers to any numerical value that indicates the strength of a correlation between a user feature and conversion.

A "cluster" generally refers to a group of units (such as a group of users) determined using a clustering analysis. A "superior cluster" is a cluster that has a higher conversion potential relative to another cluster, where the "conversion potential" for a cluster is the probability that any unit (e.g., user) of the cluster will undergo conversion.

Overview

As indicated in the Background section, some systems are available to segment populations into groups. However, these conventional systems have shortfalls that limit their use in many situations. As described, these systems tend to produce segments having conversion potentials that are relatively the same from segment to segment. And when segments of a population are formed based on individual conversion potential, such as by grouping top ranked individuals having historically high conversion rates, these segments are limited in size, as this method results in an indirect relationship between the size of a group and the group's conversion potential.

The technology described herein provides for a segmentation system that address these deficiencies by segmenting a population of users into clusters that have varying conversion potentials. That is, some clusters have conversion potentials that are greater than the conversion potentials of other clusters. A cluster having a higher conversion potential is superior to a cluster with a lower conversion potential, since individual users in the superior cluster are more likely to respond to information, such as a marketing campaign, in a preferred manner, for example, purchasing the product of the marketing campaign. This solves one of the major deficiencies that results from using conventional methods, in that conventional segmentation results in groups having a relatively similar conversion potential. The described technology further provides for a scalable approach when generating superior clusters. Meaning, an increase in the number of users associated with the superior cluster does not reduce its conversion potential, thereby improving the technology by reducing or eliminating the inverse relationship that results when using some conventional methods.

The technology described herein also provides further benefits not realized by conventional segmentation systems. For example, the segmentation system disclosed herein can identify user features from the superior cluster based on commonality of the user feature among users in the superior cluster. These identified user features are highly correlated to conversion. As such, these features may be provided to tailor specific marketing campaigns, resulting in increased effectiveness of the campaign. Conventional segmentation systems, however, are unable to identify such highly correlated features in this manner, since the identified features are common among users of a cluster that cannot be generated by conventional methods.

While this disclosure presents the invention in light of segmenting members of a population for advertisement, it should be understood that the underlying advanced segmentation technology described herein is not restricted to, and is not focused on, advertising and marketing. The technology may be used to segment any population of units that exhibit features or characteristics. For example, people may be segmented into groups to determine whether they can be persuaded to vote a specific way, objects may be segmented based on characteristics to determine whether a group of objects is effective for a specific task, large populations of IP addresses may be segmented based on activity to determine a group of IP addresses most likely to pose a security threat, a population of financial account numbers may be segmented based on activity to identify potential fraud, and so forth. Thus, while the technology described herein is not limited to marketing or advertising, it has been disclosed in this manner as one real-world example, since describing all uses for the technology would be impracticable.

Therefore, it will be understood that the technology described herein is rooted in segmentation, and that advantages the technology provides to marketers are simply benefits that flow as a result of its implementation in this area. The underlying advancement, however, lies with the technology itself and solves specific problems that relate to segmentation technology. For example, many of the deficiencies described above result from the inability of conventional technology to account for large population sizes where each member of the population has a large number of features. For example, a single member of a population may be associated with any combination of 100,000 different features, and the population itself might be 1 billion. Given that population segments may overlap, the number of potential solutions is near countless. The segmentation system described herein, has the ability to segment populations in a manner that provides a superior cluster having a relatively higher conversion potential, from which individual users and common user features may be identified. The described segmentation technology is improved because it can generate clusters from such large populations and features that have conversion potentials greater than clusters identified using conventional technologies. As such, the described improvements to the segmentation technology result in better segmentation outcomes when compared to conventional techniques.

The segmentation system described herein achieves these benefits using a combination of supervised learning and clustering techniques to generate superior clusters. Initially, a model may be trained using a set of training data that includes user features and historical conversion data. In this case, the user features are associated with users having a known conversion history, such as conversion frequency or number of conversions. Thus, the user features and the historical conversion data are used as input-output pairs to train the model. A result of the training includes feature ranking weights, which indicate the strength of the correlation between a particular feature and conversion.

A ranked order of user features is determined based on the feature ranking weights. That is, the feature ranking weights for some user features will be greater than others. As such, a user feature having a feature ranking weight greater than the feature ranking weight of another user feature will be ranked higher. Having determined the ranked order of user features, a subset of the highest ranked user features is selected. As an example, the training set might include 100,000 user features, with users exhibiting some of these user features and not others. The subset, however, might only include 2,000 user features selected from the training set.

The segmentation system performs a clustering analysis on a population of users with respect to the subset of user features. In doing so, the clustering analysis segments the population by generating clusters of users based on the subset of user features. To implement the clustering analysis, a matrix can be generated from the subset of user features and users of the population (represented by user identifiers in the matrix). A numerical indication of whether a particular user is associated with a particular user feature is provided at the intersection of the associated row and column. The feature ranking weights can be applied to the matrix by multiplying them with the numerical indications across the matrix, thus generating a second matrix that includes weighted indications of the association between the particular user and the particular user feature. The second matrix is used as an input for the clustering analysis to generate the clusters.

As a result, each of the generated clusters is associated with a conversion potential, the probability that each user in the cluster will convert. Here, the generated clusters have various conversion potentials. When one cluster has a greater conversion potential than another cluster, it is said to be "superior" to the other cluster, and thus is a superior cluster. A superior cluster may be identified from the clusters based on it having a conversion potential above a threshold value or by having the highest conversion potential of the clusters generated by the analysis.

The superior cluster may be provided to a marketer. Individual users associated with the superior cluster might be provided to a marketer that targets the users with an advertisement campaign, since the user is more likely to respond to the advertisement campaign (i.e., convert) by virtue of its association with the superior cluster having the higher conversion potential. Moreover, user features that are common among users of the superior cluster can be identified. Since these user features have a commonality among users of the cluster having the higher conversion potential, it is likely that these features may correlate to the conversion potential of an individual user more strongly than others. As such, these common features may be identified and provided to a marketer, so that an advertisement campaign can incorporate or target these specific user features, thereby increasing the effectiveness of the advertisement campaign in converting users.

Example Segmentation System Operating Environment

FIG. 1 depicts a block diagram of example operating environment 100, which is suitable for use in implementing the described technology. Generally, operating environment 100 is suitable for generating superior clusters. As illustrated, operating environment 100 includes a number of client devices, such as client devices 102a and 102b through 102n, network 104, and server 106.

In general, it should be understood that this and other arrangements described herein are only examples, intended to illustrate one arrangement suitable for implementing the technology. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 6.

With specific reference to FIG. 1, each of the components illustrated may be implemented via any type of computing device, such as computing device 600 described in connection to FIG. 6. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of client devices, servers, and other components may be employed within operating environment 100. Each may comprise a single device or multiple devices cooperating in a distributed environment.

In general, client devices 102a through 102n can be any type of computing device capable of being operated by a client, which could be a user associated with a population of users, a marketing entity, or any other individual or entity communicating with server 106.

Figure 6:
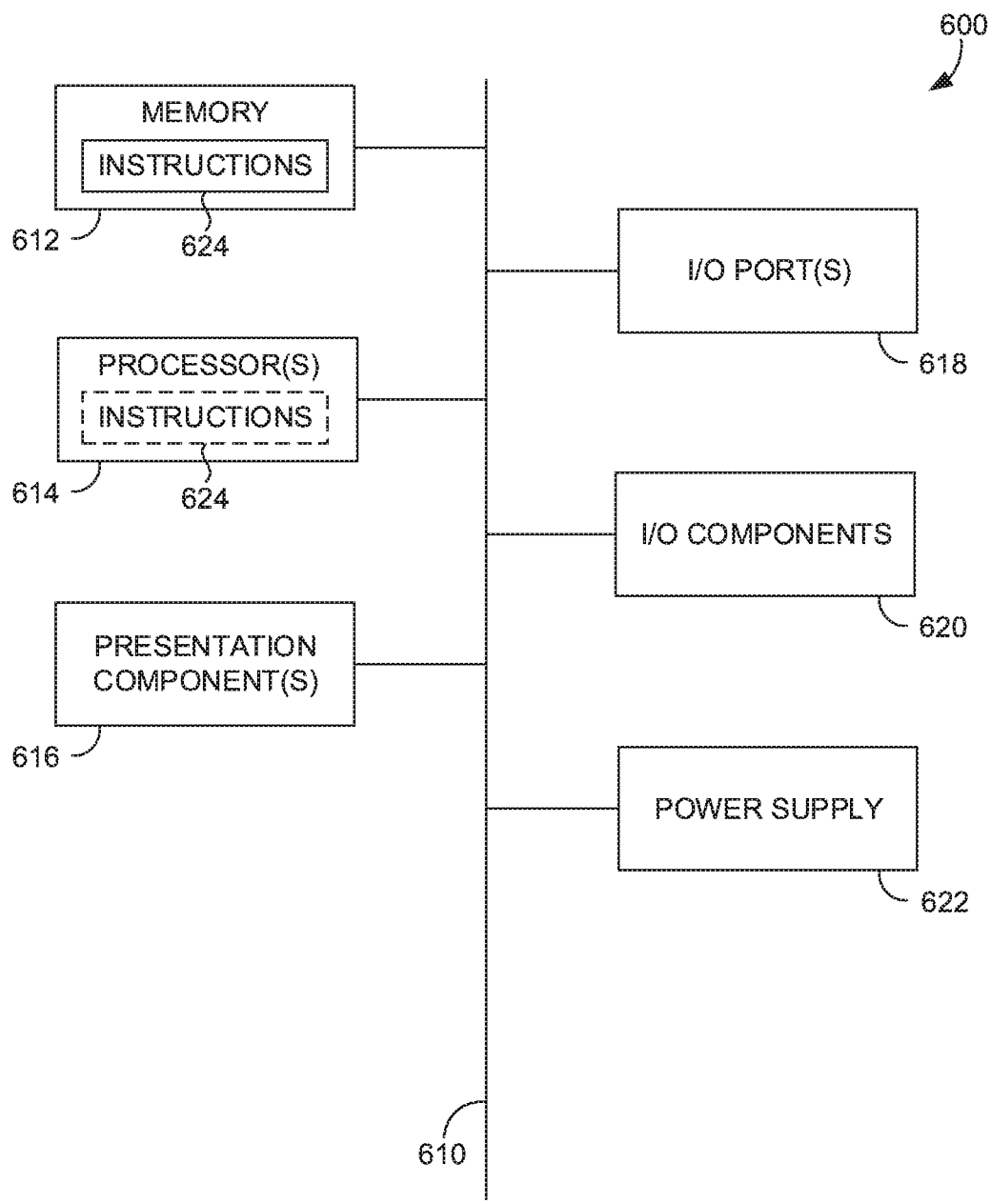
FIG. 6 is a block diagram of an example operating environment in which aspects of the present technology may be employed.

In some implementations, client devices 102a through 102n are the type of computing device described in relation to FIG. 6. For example, client device 102a may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Although reference has been made only to client device 102a, it is intended throughout this disclosure that client devices 102b though 102n are equally considered.

Client device 102a can include one or more processors, and one or more computer-readable media. The computer-readable media may include computer-readable instructions executable by the one or more processors. The instructions may be embodied by one or more applications, such as application 110 of client device 102a, shown in FIG. 1. Application 110 is referred to as a single application for simplicity, but its functionality can be embodied by one or more applications in practice.

Application 110 may generally be any application capable of facilitating the exchange of information between client devices 102a through 102n or server 106 for providing user features associated with a user of the client device and receiving information, such as user identifiers or user features provided by server 106. In some implementations, application 110 comprises a web application, which can run in a web browser, and could be hosted at least partially on the server-side of operating environment 100. Application 110 can comprise a dedicated application, such as an application having analytics functionality. In some cases, application 110 is integrated into the operating system (e.g., as a service or program). It is contemplated that "application" be interpreted broadly. In some embodiments, application 110 may be integrated with segmentation system 108.

Server 106 generally supports segmentation system 108. Server 106 includes one or more processors, and one or more computer-readable media. The computer-readable media includes computer-readable instructions executable by the one or more processors. The instructions may optionally implement one or more components of segmentation system 108, described in additional detail below with reference to FIG. 2. It should be appreciated that while segmentation system 108 is depicted as a single system, it can function as multiple systems capable of performing all the attributes of the system as described. As previous discussed, FIG. 2 just one example arrangement suitable for using the technology; however, other arrangements are sufficient for use as well. For example, server 106 may reside on any or all of client devices 102*a* through 102*n*.

Figure 2:
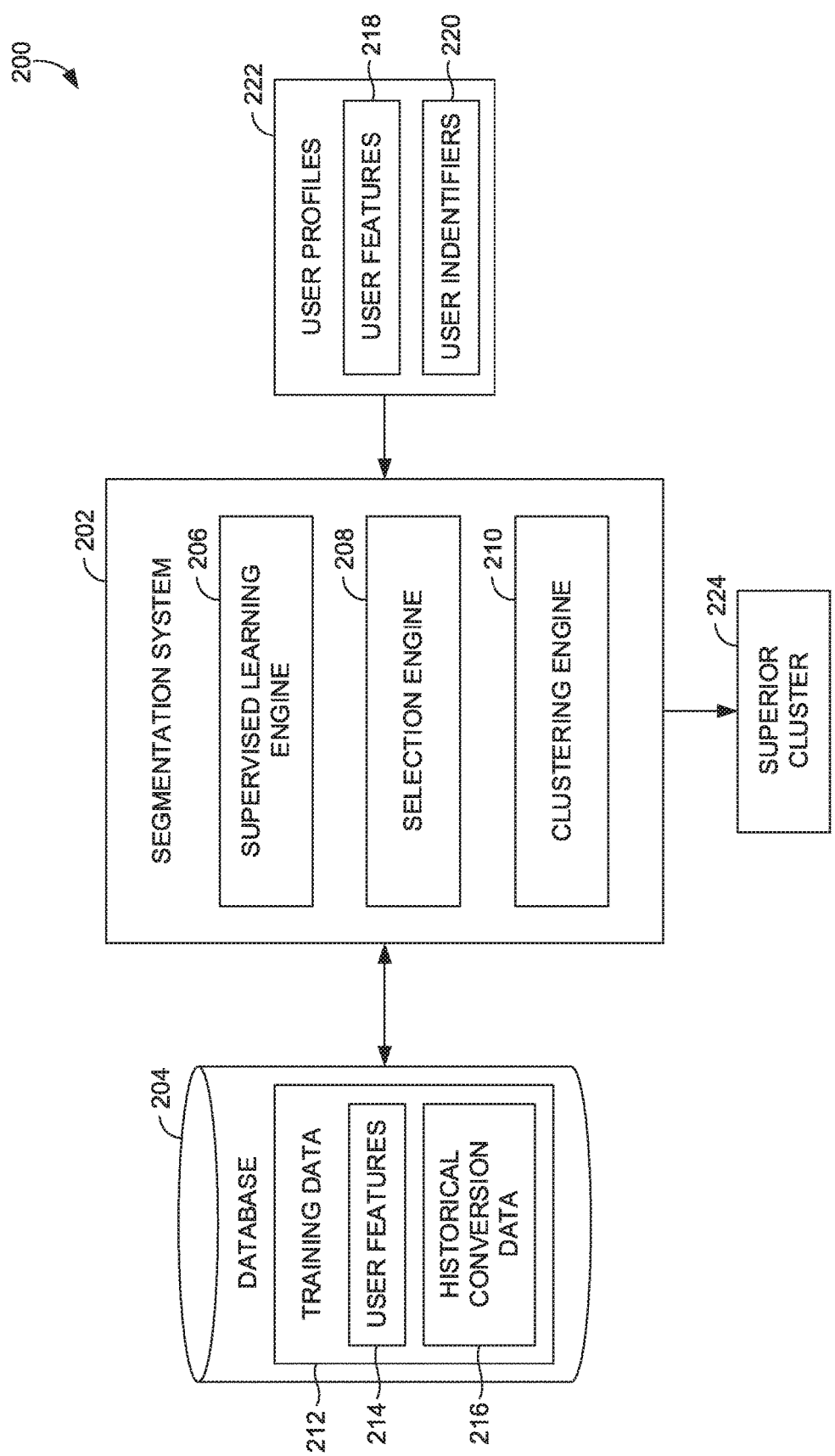
FIG. 2 is a block diagram including an example segmentation system, in accordance with an aspect described herein.

With reference now to FIG. 2, block diagram 200 is provided illustrating segmentation system 202. Segmentation system 202 is one example system suitable for implementing the technology described herein and may be employed as segmentation system 108 of FIG. 1.

Segmentation system 202 is shown in communication with database 204. Database 204 generally stores information including data, computer instructions (e.g., software program instructions, routines, or services), or models used in embodiments of the described technologies. Although depicted as a database component, database 204 may be embodied as one or more data stores or may be in the cloud. One example suitable for use as database 204 is ADOBE® Data Warehouse.

In general, segmentation system 202 segments populations of users into clusters that are groups of users from the population. As part of generating and providing user clusters, segmentation system 202 can identify a cluster as a superior cluster, based on the superior cluster having a conversion potential that is relatively greater than conversion potentials for other clusters. From the superior cluster, segmentation system 202 generally provides user information, such as identifiers, of users associated with the superior cluster. Moreover, segmentation system 202 can identify and provide user features common among users associated with the superior cluster. To do so, segmentation system 202 of FIG. 2 employs supervised learning engine 206, selection engine 208, and clustering engine 210.

In general, supervised learning engine 206 utilizes training data 212 to train a supervised model that determines feature ranking weights indicating the strength of the correlation between user features 214 and user conversion. XGboost (Extreme Gradient Boosting) is one example supervised model that may be used with the present technology. Other example supervised models that may be suitable for use comprise support vector machines, linear regression, logistic regression, naïve Bayes classifiers, decision trees, k-nearest neighbor algorithm, neural networks, and the like.

Training data 212, shown in FIG. 2 stored at database 204, includes user features 214 and historical conversion data 216. User features 214 generally include any piece of information that can be attributable to, or exhibited by, a user. User features 214 can include raw features and derived features.

Raw features are features that may be determined from an action or characteristic of a particular user. For instance, a user may take an action such as download a computer application, launch the computer application, create a social post or interact with a social post, receive or open an email, perform a keyword search, add an item to an online shopping cart, purchase an item, participate in online gaming, view an advertisement, and so on. Some of these features include a timestamp associated with the action, such as a time and date associated with the user receiving an email and one associated with opening the email, or a time and date associated with the user viewing an advertisement and one associated with purchasing the item in an online store. Raw features can also include characteristics of the user. Examples include country of residence, age, ethnicity, gender, skin tone, allergies, native language, education level, career type, body size, and so forth. Characteristics about the user may be received directly from the user or another source having information about the user, or they may be inferred from the user's activity. For example, a country of residence may be inferred for a user from a delivery address, from repeated use of an IP address, from a language setting for the user, and the like.

Derived features are those features that may be derived from two or more raw features, or a raw feature and another associated item of information. For example, the user may receive an email at a certain time and open the email at a later time. The amount of time between receiving the email and opening the email is a derived feature. In another example, the time between the user viewing an advertisement and purchasing an item is a derived feature. Yet another example may include particular characteristics of an advertisement campaign that is associated with a product previously purchased by the user.

In general, the number of user features that may be identified could be any number. As an example, more than 100,000 user features may be identified. Thus, within a given population of users, the typical user will exhibit only a portion of the overall identified features, and the combination of features that are exhibited by individual users will vary among the population. As such, user features 214 can include an indication of the user features exhibited by each user of the population. This may be stored within a user profile for each user at database 204.

Training data 212 further comprises historical conversion data 216 for users of the population. As described, conversion data generally represents information related to a user's conversion, which broadly, is a user's response to certain information. In keeping with the marketing context, a user may "convert" when purchasing a product or service after receiving an advertisement for it. In a similar context, the user may "convert" when clicking on a website hyperlink that displays an advertisement. Historical conversion data 216 can include information related to past conversions for users of the population, such as an individual user's total past conversions, the frequency the user converts, whether the user has ever converted, and the like.

Referring back to supervised learning engine 206, supervised learning engine 206 trains a supervised model using training data 212. User features 214 and historical conversion data 216 may serve as input-output pairs for the training. In one method, user features 214 serve as inputs, while historical conversion data 216 serves as the outputs of the pairs.

As a result of this training, supervised learning engine 206 identifies feature ranking weights, which is a numerical value or other indication representing the strength of a correlation between user features and user conversion. For example, a user feature may have an associated feature ranking weight that numerically indicates its correlation to conversion. In one scheme, a negative value can indicate that the user feature reduces the likelihood of conversion, whereas a positive value can indicate that the user feature increases the likelihood of conversion, while a null value represents no correlation to conversion.

Based on the feature ranking weights, supervised learning engine 206 can determine a ranked order of the user features.

The ranked order can include a higher ranking for those user features that are more strongly correlated to conversion, as indicated by the feature ranking weight associated with each user feature.

Selection engine 208 generally selects a subset of user features. The subset of user features may be selected from the ranked order of user features. Any number may be selected for the subset. In one example, 2,000 user features are selected from an initial population of 100,000 to form the subset. Selection engine 208 can select a predetermined number of highest ranked user features. Selection engine 208 can select a number of user features from the ranked order based on the feature ranking weights. That is, selection engine 208 can select user features having associated feature ranking weights greater than a threshold value. For example, if only 1,000 user features have associated feature ranking weights greater than the threshold, selection engine 208 selects this 1,000 for the subset. The threshold value may be set to maximize conversion potential for clusters based on quantitative analysis of the clusters, as will be further described below.

Clustering engine 210 of segmentation system 202 generally generates clusters for a population of users, based on the subset of user features determined by selection engine 208. As an example, clustering engine 210 receives an input of information related to the population of users, including user features 218 and user identifiers 220. This information is included in user profiles 222. For example, a user of the population can have a user profile, in which the user is represented by a user identifier. The user profile for the user includes various user features associated with the user. Some of the user features correspond to the subset of user features previously selected.

Clustering engine 210 performs a clustering analysis on the information related to the population of users received as the input. Hierarchal clustering analyses, such as agglomerative clustering, are suitable for use by clustering engine 210. Other examples that may be suitable for use include spectral clustering, density-based spatial clustering (DB-SCAN), k-means clustering, and other forms of centroid-based clustering, distributing-based clustering, density-based clustering, and so forth.

Some clustering analyses utilized by clustering engine 210 use matrices to identify clusters of users from the population. In an example method suitable for use with the clustering analysis, a first matrix is generated having columns that indicate the subset of features and rows that represent the population of users. An indication at the intersection of a row and column indicates whether a user is associated with a particular user feature. The indication can be a numerical representation.

Continuing with this example, the feature ranking weights determined by supervised learning engine 206 are applied to the first matrix. Here, the feature ranking weight of each user feature is multiplied by the numerical representations indicating whether the user is associated with the user feature.

As a result, clustering engine 210 generates a second matrix. The second matrix comprises a weighted indication of association between users and user features. This weighted indication represents how strongly a particular user feature for a particular user correlates to conversion potential. The second matrix is then used as an input for the clustering analysis to generate clusters of users, thereby segmenting the population of users.

FIG. 3 is provided to illustrate a similar example of matrices suitable for use by clustering engine 210. Referencing now FIG. 3, first matrix 300 comprises columns representing user features, where the user features are part of a selected subset of user features. Column 302 representing "Feature 1" and column 304 representing "Feature 2" are two examples. First matrix 300 further comprises rows that represent users of a population of users. As illustrated, row 306 represents a first user that is associated with the user identifier "User 1," and row 308 represents a second user that is associated with the user identifier "User 2." At the intersection of the rows and columns, there are numerical representations that indicate whether a user is associated with a feature. As illustrated, a "1" is provided at the intersection of column 302 and row 306, indicating the first user is associated with "Feature 1," while a "0" at the intersection of column 304 and row 306 indicates that the first user is not associated with "Feature 2."

Feature ranking weights 310 for each of the user features may be applied to first matrix 300 to generate second matrix 312. It will be understood that the specific feature ranking weights of feature ranking weights 310 are illustrated as examples, and that other feature ranking weights will be determined based on the supervised learning, as previously discussed. To apply feature ranking weights 310 to first matrix 300, the feature ranking weight for each feature is multiplied to the numerical indications along the column representing that user feature. Thus, the feature ranking weight "0.21" for Feature 1 is multiplied to each indication along column 302. The result is illustrated in column 314 of second matrix 312. Thus, at the intersection of column 314 and row 316, a weighted indication of "1×0.21" is illustrated.

Turning back to FIG. 2, the output of the clustering analysis performed by clustering engine 210 comprises clusters that include various segments of users of the population. Each of the clusters comprises a conversion potential that is the probability each user of the cluster will "convert" in response to an advertisement campaign. The conversion potential is derived from the combination of user features associated with the users of the cluster and the feature ranking weights associated with those user features, since the feature ranking weights are determined by the supervised learning model having user features and historical conversion data as input-output pairs, as previously discussed.

As a result of the clustering analysis, clusters are generated having various conversion potentials. Thus, the resulting clusters include some clusters with higher conversion potentials than other clusters. A cluster having a higher conversion potential is said to be "superior" to a cluster with a relatively lower conversion potential. Thus, it is a superior cluster. In some cases, a cluster having the highest conversion potential of the identified clusters is termed the "superior cluster," which can be identified by clustering engine 210 and is illustrated as superior cluster 224 shown as an output of segmentation system 202.

Segmentation system 202 can provide user features and user information based on the identification of the superior cluster. As an example, segmentation system 202 may provide user information associated with all of, or a portion of, the users associated with the superior cluster. Moreover, segmentation system 202 can further identify user features that are common among members of the superior cluster. Common may mean that all users associated with the superior cluster share a particular user feature. In other cases, common means that a portion of the users shares the user feature. That portion could be between 90% and 100%, between 80% and 90%, between 70% and 80%, between 60% and 70%, or between 50% and 60%. In some cases, common means less than 50%. This is because the commonality of a user feature among members of the superior cluster is relative. For instance, a superior cluster where the most common user feature is shared by 90% of its members has a higher threshold for commonality than a superior cluster where the most common user feature is shared by 60% of its members. Segmentation system 202 can identify the most common user features in the superior cluster by identifying a predetermined number of user features, identifying a number of user features that are above a threshold commonality percentage, or any other method.

Quantitative measurements may be used to better understand the effectiveness of clusters generated by clustering engine 210. That is, results determined using quantitative measurement techniques can provide an objective way to determine whether a statistically more accurate cluster group might exist or whether the cluster groups being examined may be relied upon as accurately reflecting each cluster's conversion probability. The use of various quantitative analysis techniques and the interpretation of their results will be understood by those of ordinary skill in the art. However, some example techniques suitable for use in accessing performance of clustering engine 210 include determining a mean distance ratio or a Calinski-Harabasz index. Additional methods may include silhouette width, Daves-Bouldine index, Dunn index, bootstrap evaluation, and the like.

It will be understood by one of ordinary skill in the art that changes to inputs and variables may be made at supervised learning engine 206, selection engine 208, or clustering engine 210, to affect the output of clusters provided by clustering engine 210. These changes may increase the accuracy of each cluster's conversion potential, or may increase conversion potential in some clusters, while decreasing conversion potential in other clusters.

In some cases, the changes will be made based on the results of the quantitative analysis methods. Some of these changes include adding or removing user features from the training population, selecting a different subset of user features, changing the supervised learning method or the clustering analysis method, and selecting different numbers of clusters as outputs for clustering engine 210. All such variations and combinations of user features, supervised learning methods, subset selection, and clustering analysis methods, and the like are intended to be within the scope of this disclosure.

Additional specific methods that can be employed to adjust the cluster output results of clustering engine 210 include modifying the threshold value by increasing or decreasing the threshold value for the feature ranking weights used by selection engine 208 when selecting the subset of user features, restricting a number of clusters as the output of clustering engine 210, applying parameters to the conversion potentials of clusters generated by clustering engine 210, and the like.

In one use-case example, the described technology may be implemented to provide benefits to marketers. Based on the superior cluster generated by clustering engine 210, an advertisement campaign may be generated. This also includes providing the results or information derived from the superior cluster to the marketer, wherein based on providing the results, the marketer generates an advertisement campaign accordingly. For example, user information about users that are associated with the superior cluster may be provided to the marketer, so that the marketer may target these specific users for receiving an advertisement campaign. Since the superior cluster includes a relatively high conversion potential, these users are more likely to convert in response to the advertisement campaign. Moreover, user features that are identified as common among members of the superior cluster can be provided to a marketer, where the marketer generates an advertisement campaign based on the common user features.

Example Flow Diagrams

Figure 4:
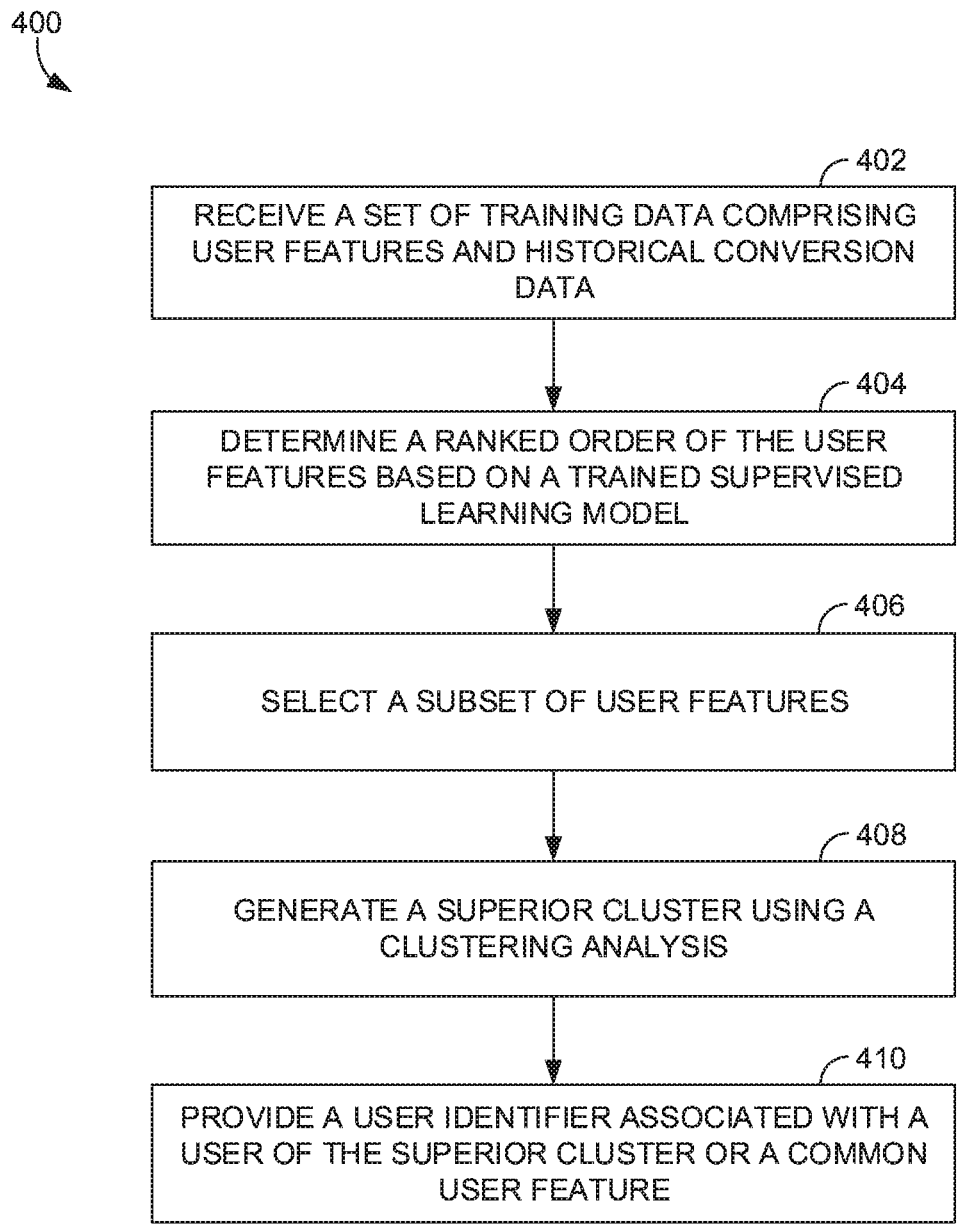
FIG. 4 is a flow diagram illustrating an example method for generating a superior cluster, in accordance with an aspect described herein.
Figure 5:
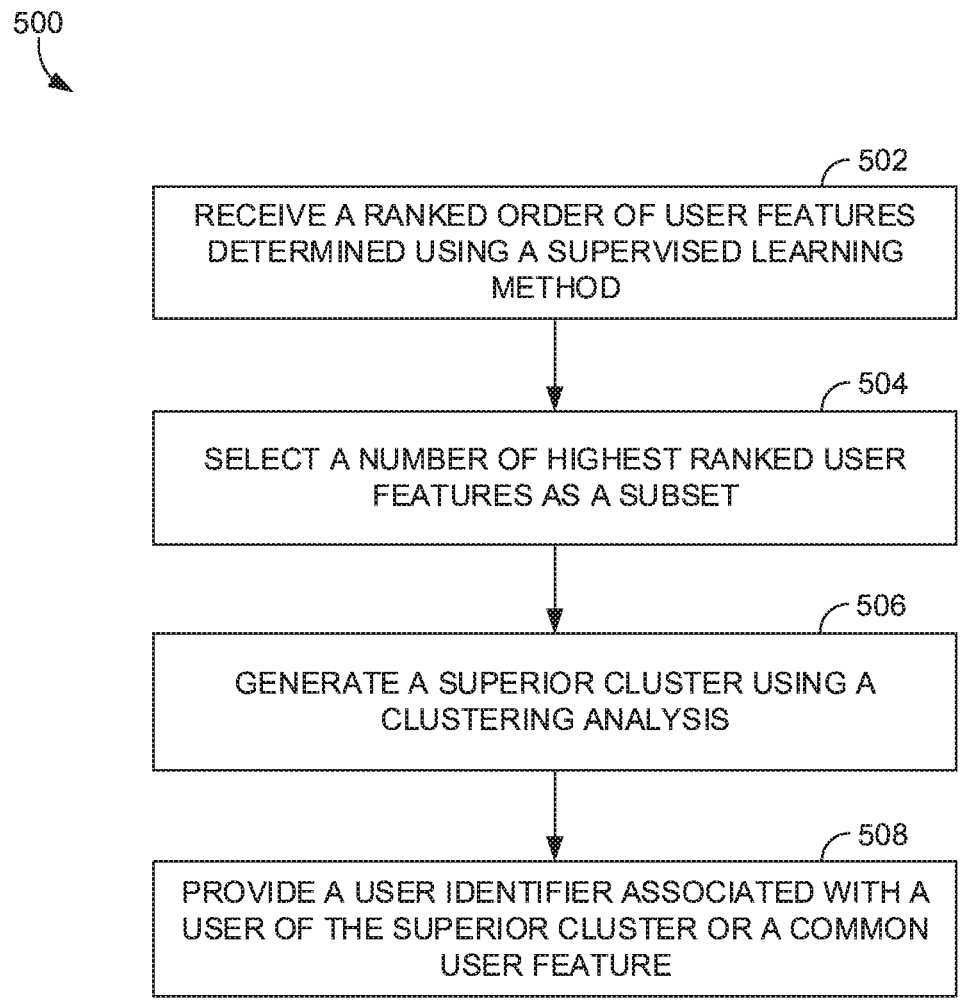
FIG. 5 is a flow diagram illustrating another example method for generating a superior cluster, in accordance with an aspect described herein.

With reference now to FIGS. 4 and 5, flow diagrams are provided illustrating methods 400 and 500. Each block of methods 400 and 500, and any other methods described herein, comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 400 and 500 may be implemented by segmentation system 202 described with reference to FIG. 2.

Turning initially to FIG. 4, a flow diagram is provided that illustrates an example method 400 for providing user information or user features based on generating a superior cluster of users from a population. At block 402, a set of training data comprising user features and historical conversion data is received. This can be received at a segmentation system, such as segmentation system 202 of FIG. 2. The training data comprises user features and historical user data. At block 404, a ranked order of the user features is determined. The ranked order is determined using a supervised learning model and training it using the training data received at block 402. A supervised learning engine, such as supervised learning engine 206 of FIG. 2, may be employed to train the supervised model. The ranked order of user features can be determined using feature ranking weights determined from training the supervised model. To train the model, the supervised learning engine can use the user features and historical conversion data as input-output pairs At block 406, a subset of user features is selected. The subset may be selected by a selection engine, such as selection engine 208 of FIG. 2. The subset is selected based on the ranked order of the user features determined at block 404. At block 408, a superior cluster is generated. A clustering engine, such as clustering engine 210 of FIG. 2, can perform a clustering analysis that generates clusters based on the subset of user features and user information of the population. The user information includes whether the users are associated with attributes that correspond to those in the subset. In some cases, a first matrix having the indication or a second matrix having weighted indications, which are based on the feature ranking weights, can be used to perform the clustering analysis. The resulting clusters that are outputs of the clustering analysis each comprise a conversion potential. A superior cluster can be identified from the clusters based on its associated conversion potential being relatively greater than other clusters.

At block 410, a user identifier associated with a user of the superior cluster or a user feature common among users of the cluster can be provided. This may be provided to a marketer for an advertising campaign. The advertising campaign may be generated and used to target users of the superior cluster, or the campaign can be generated to incorporate or target the common user features.

Turning now to FIG. 5, a flow diagram is provided that illustrates another example method 500 for providing user information or user features based on generating a superior cluster of users from a population. At block 502, a ranked order of user features is received. The ranked order can be based on user feature weights determined from a supervised learning model trained from a set of training data comprising the user features and historical conversion data as input-output pairs. A supervised learning engine, such as supervised learning engine 206, may be employed to train the supervised learning model and determine the ranked order.

At block 504, a number of highest ranked user features is selected as a subset. This can be done by selecting user features with a feature ranking weight greater than a threshold value. In some cases, the number of highest ranked user features may be based on a predetermined number of user features for the subset. The predetermined number of user features may be determined based on quantitative methods that assess the statistical effectiveness of clusters generated based on the selected subset. A selection engine, such as selection engine 208 of FIG. 2, can be used to select the user features for the subset.

At block 506, a superior cluster is generated. A clustering engine, such as clustering engine 210 of FIG. 2, can be used to generate clusters having associated conversion potentials from the subset selected at block 504. The clustering engine can identify the superior cluster from the generated clusters based on the superior cluster having a conversion potential that is relatively greater than the conversion potential of other clusters.

At block 508, user information, such as a user identifier, is provided for a user associated with the superior cluster. Additionally or alternatively, common user features identified from among members of the cluster can be provided. These can be provided to a marketer for generation of an advertisement campaign targeting the user or incorporating the common user features.

Example Operating Environment

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an example computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support providing user information or user features determined from a superior cluster having a higher conversion potential. The components described herein refer to integrated components of product recommendation system. The integrated components refer to the hardware architecture and software framework that support functionality using the product determination system. The hardware architecture refers to physical components and interrelationships thereof and the software framework refers to software providing functionality that can be implemented with hardware embodied on a device.

The end-to-end software-based product recommendation system can operate within the product recommendation components to operate computer hardware to provide the user information or user features. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the product recommendation system components can manage resources and provide services for the product recommendation system functionality. Any other variations and combinations thereof are contemplated with embodiments of the present invention.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

From the foregoing, it will be seen that this technology is one well adapted to attain all the ends and objects described above, including other advantages, which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media having computer-useable instructions that, when used by one or more computing devices, cause the one or more computing devices to perform operations comprising:

receiving a set of training data comprising user features and historical conversion data;

training a supervised learning model on the set of training data to determine feature ranking weights for each user feature;

determining a ranked order of the user features based on the feature ranking weight associated with each user feature;

selecting a number of highest ranked user features as a subset of user features based on the ranked order, wherein the number of highest ranked user features included in the subset of user features is based on a feature ranking weight threshold, the number determined by selecting the user features having associated feature ranking weights greater than the feature ranking weight threshold;

generating clusters by performing a clustering analysis on a dataset indicating an association between a population of users and the selected subset of user features, the clusters each comprising a segment of users within the population of users, wherein the clusters generated by the clustering analysis are restricted to a particular number of clusters based on a quantitative analysis of a previously determined cluster group;

determining, for each cluster of the clusters, conversion potentials for the clusters based at least on a combination of the feature ranking weights determined from the supervised learning model and user features associated with the segment of users, of each cluster;

selecting a superior cluster from the clusters based on the conversion potential of the superior cluster, the conversion potential of the superior cluster being greater than a conversion potential of other clusters identified from the clustering analysis;

providing a user identifier for a user associated with the superior cluster or a user feature identified from the superior cluster based on the conversion potential of the superior cluster;
performing a second quantitative analysis technique on clusters identified from the clustering analysis to determine cluster effectiveness; and
based on results determined from the second quantitative analysis technique, modifying the feature ranking weight threshold.

2. The media of claim 1, further comprising generating an advertisement campaign that targets the user feature identified from the superior cluster, wherein the conversion potential for the superior cluster is a probability that the user associated with the superior cluster will respond to the advertisement campaign.

3. The media of claim 1, wherein the user features of the set of training data include both a raw feature and a derived feature, wherein the raw feature is determined based on a user action or characteristic, and wherein the derived feature is derived from two or more raw features.

4. The media of claim 1, wherein generating the clusters further comprises:
generating a first matrix comprising columns representing the subset of user features and comprising rows representing the population of users, wherein the first matrix includes an indication whether a particular user is associated with a particular user feature;
applying the feature ranking weights for the subset of user features to the first matrix to generate a second matrix comprising columns representing the subset of user features and comprising rows representing the population of users, wherein the second matrix includes a weighted indication of association between the particular user and the particular user feature; and
performing the clustering analysis on the second matrix to identify the clusters comprising segments of users from among the population of users.

5. The media of claim 1, wherein the user feature is identified from the superior cluster based on commonality of the user feature among the users associated with the superior cluster.

6. The media of claim 1, wherein the clustering analysis is a hierarchal clustering analysis.

7. The media of claim 6, wherein the clustering analysis is agglomerative clustering.

8. A computerized method, the method comprising:
training a supervised learning model on a set of training data comprising user features and historical conversion data to determine features ranking weights;
ranking the user features based on the feature ranking weights to determine a ranked order of user features;
from the ranked order of user features, selecting a number of highest ranked user features as a subset of user features, wherein the number of highest ranked user features included in the subset of user features is based on a feature ranking weight threshold, the number determined by selecting the user features having associated feature ranking weights greater than the feature ranking weight threshold;
generating clusters by performing a clustering analysis on a dataset indicating an association between a population of users and the selected subset of user features, the clusters each comprising a segment of users within the population of users, wherein the clusters generated by the clustering analysis are restricted to a particular number of clusters based on a quantitative analysis of a previously determined cluster group;
determining, for each cluster of the clusters, conversion potentials for the clusters based at least on a combination of the feature ranking weights determined from the supervised learning model and user features associated with the segment of users, of each cluster;
selecting a superior cluster from the clusters based on the conversion potential of the superior cluster, the conversion potential of the superior cluster being greater than a conversion potential of other clusters identified from the clustering analysis;
providing a user identifier for a user associated with the superior cluster or a user feature identified from the superior cluster based on the conversion potential of the superior cluster;
performing a second quantitative analysis technique on clusters identified from the clustering analysis to determine cluster effectiveness; and
based on results determined from the second quantitative analysis technique, modifying the feature ranking weight threshold.

9. The method of claim 8, further comprising generating an advertisement campaign that targets the user feature identified from the superior cluster, wherein the conversion potential for the superior cluster is a probability that the user associated with the superior cluster will respond to the advertisement campaign.

10. The method of claim 8, wherein generating the clusters further comprises:
generating a first matrix comprising columns representing the subset of user features and comprising rows representing the population of users, wherein the first matrix includes an indication whether a particular user is associated with a particular user feature;
applying the feature ranking weights for the subset of user features to the first matrix to generate a second matrix comprising columns representing the subset of user features and comprising rows representing the population of users, wherein the second matrix includes a weighted indication of association between the particular user and the particular user feature; and
performing the clustering analysis on the second matrix to identify the clusters comprising segments of users from among the population of users.

11. The method of claim 8, wherein the user feature is identified from the superior cluster based on commonality of the user feature among the users associated with the superior cluster.

12. The method of claim 8, wherein the clustering analysis is a hierarchal clustering analysis.

13. A computer system comprising:
a memory component; and
a processing device coupled to the memory component, the processing device to perform operations comprising:
training a supervised learning model on a set of training data comprising user features and historical conversion data to determine a feature ranking weight for each user feature;
generating a ranked order of the user features based on the feature ranking weight associated with each user feature;
generating clusters by performing a clustering analysis on a dataset indicating an association between a population of users and a subset of user features selected from the ranked order of the user features based on the ranking determined using the supervised learning model, the subset of user features selected based on the subset comprising a number of highest ranked user features, the clusters each comprising a segment of users within the population of users, wherein the clusters generated by the clustering analysis are restricted to a particular number of clusters based on a quantitative analysis of a previously determined cluster group, and , wherein the number of highest ranked user features included in the subset of user features is based on a feature ranking weight threshold, the number determined by selecting the user features having associated feature ranking weights greater than the feature ranking weight threshold;

determining, for each cluster of the clusters, conversion potentials for the clusters based at least on a combination of the feature ranking weights determined from the supervised learning model and user features associated with the segment of users, of each cluster;

selecting a superior cluster from the clusters based on the conversion potential of the superior cluster, the conversion potential of the superior cluster being greater than a conversion potential of other clusters identified from the clustering analysis;

providing a user identifier for a user associated with the superior cluster or a user feature identified from the superior cluster based on the conversion potential of the superior cluster;

performing a second quantitative analysis technique on clusters identified from the clustering analysis to determine cluster effectiveness; and based on results determined from the second quantitative analysis technique, modifying the feature ranking weight threshold.

14. The system of claim 13, wherein generating the clusters further comprises:

generating a first matrix comprising columns representing the subset of user features and comprising rows representing the population of users, wherein the first matrix includes an indication whether a particular user is associated with a particular user feature;

applying the feature ranking weights for the subset of user features to the first matrix to generate a second matrix comprising columns representing the subset of user features and comprising rows representing the population of users, wherein the second matrix includes a weighted indication of association between the particular user and the particular user feature; and performing the clustering analysis on the second matrix to identify the clusters comprising segments of users from among the population of users.

15. The system of claim 13, wherein the user feature is identified from the superior cluster based on commonality of the user feature among the users associated with the superior cluster.

16. The system of claim 13, wherein the clustering analysis is a hierarchal clustering analysis.

17. The method of claim 8, further comprising:

determining a common user feature from the superior cluster based on a portion of the segment of users, of the superior cluster, sharing the common user feature; and providing the common user feature determined from the superior cluster.

\* \* \* \* \*